March 23, 1943.     W. A. BEDFORD, JR     2,314,756
LOCK NUT
Filed June 14, 1941

Inventor:
William A. Bedford, Jr.
By John Todd Att'y.

Patented Mar. 23, 1943

2,314,756

UNITED STATES PATENT OFFICE 2,314,756

LOCK NUT

William A. Bedford, Jr., Hingham, Mass., assignor to United-Carr Fastener Corporation, Cambridge, Mass., a corporation of Massachusetts Application June 14, 1941, Serial No. 398,090

4 Claims. (Cl. 151—21)

The present invention relates to improvements in self-locking wing nuts for threaded fastening installations and aims generally to improve existing devices of this kind.

In the accompanying drawing I have illustrated a preferred form of my invention which is simple of construction, economical of manufacture and efficient for its intended purpose.

Referring to the drawing

Figure 1:
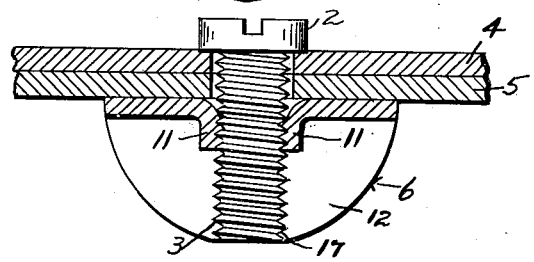
Fig. 1 is a sectional view of a typical threaded installation employing my invention.
Figure 2:
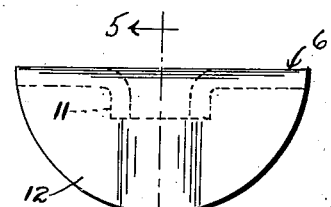
Fig. 2 is a side elevation of a wing nut constructed in accordance with the invention.
Figure 3:
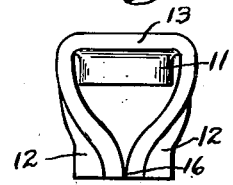
Fig. 3 is an end view thereof.
Figure 4:
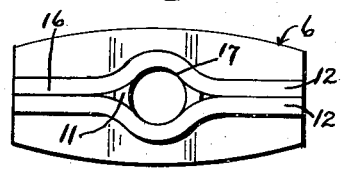
Fig. 4 is a bottom plan thereof.
Figure 5:
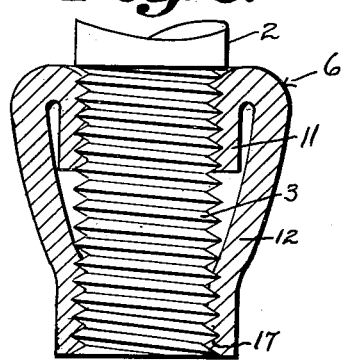
Fig. 5 is an enlarged transverse vertical section as taken on the line 5—5 of Fig. 2.
Figure 6:
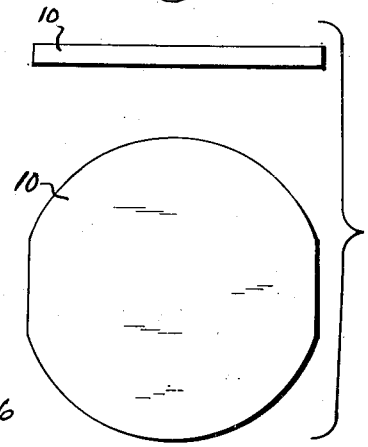
Figs. 6, 7 and 8 are diagrammatic views illustrating steps of the method of making the wing nut.
Figure 7:
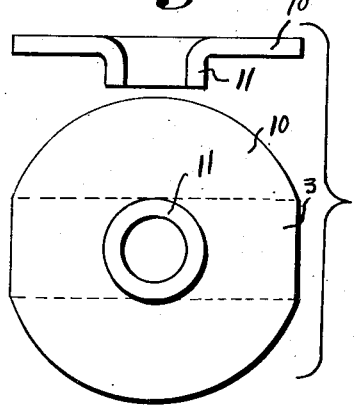
Figure 8:
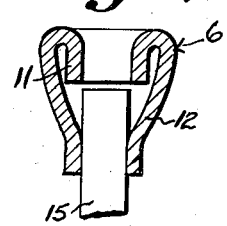

The wing nut of the present invention is intended for use with threaded fastenings, such as a screw or bolt, having a head 2 and a threaded shank 3, which may be passed through apertures in a plurality of plates 4—5, and receive the wing nut 6, whereby the plates may be clamped between the head 2 and nut 6.

According to the invention, the wing nut may be formed from a single blank 10 of generally circular or slightly elongated circular sheet metal disc. An integral tubular shank 11 is then drawn from the blank to form a bolt or screw-receiving shank. Thereafter, side portions 12 of the disk on opposite sides of the shank are bent towards each other to form a base 13 in a plane normal to the axis of the sheet, the folded wings forming a handle portion adapted to be engaged by the user in turning the nut.

In bending the wings or side portions 12 together, they are formed around a mandrel 15 of slightly less diameter than the bore of the shank 11, and poistioned axially of the shank. Portions of the wings on opposite sides of the mandrel are pinched together into contact with each other, as at 16, thus forming, in said wings, an elliptical bolt or screw-receiving bore or passage 17, the minimum diameter of which is less than the internal diameter of the shank 11, or the diameter of the screw.

The bore of the shank 11 and the inner face of the wings along the minimum diameter of the passage 17 are then threaded as by a usual tapping operation, and as the minimum diameter of the passage 17 is less than the bore of the shank 11, the root diameter of the threaded passage will be less than the outside diameter of the screw.

In practice, the wing nut 6 may be easily threaded upon the shank 3 of the screw, until the end of the screw enters threaded passage 17 in the wings 12. The minimum diameter of the passage 17 being less than the diameter of the screw shank 3, there is a resistance to threading the passage 17 over the screw shank. However, the wings 12, being of sheet metal and integrally formed with the base 13 are yieldable to a sufficient degree to permit slight separation thereof, allowing the passage 17 to be threaded upon the shank 3.

The wings 12, however, possess sufficient stiffness so as to exact a considerable tension or drag upon the screw shank 3 so that considerable force is required to effect a complete threading of the shank 11 and passage 17 upon the screw shank 3. This effectively resists accidental unthreading of the wing nut, after it has once been threaded to clamping position.

While it is desirable that the side portions of the wings along the minimum diameter of the passage 17 be threaded, as above described, conceivably these may be omitted in certain cheap and inexpensive installations where repeated removal of the wing nut from the screw is not contemplated. In such case the inner side of the wings 12, along the minimum diameter of the passage exact a drag or braking effect against the sides of the screw.

My invention is not to be interpreted narrowly as limited to the specific forms and constructions shown and described, which are intended merely as illustrative, but includes as well equivalent constructions and steps as may fall within the scope of the appended claims.

I claim:

1. A wing nut formed from a flat strip of sheet metal comprising a base having a screw-receiving opening and elements adjacent said opening for threaded engagement with said screw, resilient wings integral with opposed side edges of said base extending outwardly from said base, said wings having their inner broad surfaces in opposed facing relation and portions of said wings combining to form finger-gripping elements, and portions of said wings being cupped and threaded and constituting a yieldable threaded screw-receiving passage in substantial alignment with said screw-receiving opening.

2. A wing nut formed from a flat strip of sheet metal comprising a base having a screw-receiving opening and elements adjacent said opening for threaded engagement with said screw, resilient wings integral with opposed side edges of said base extending outwardly from said base, said wings having their inner broad surfaces in opposed facing relation and portions of said wings abutting at their outer edges to form finger-gripping elements, and said wings having portions intermediate said abutting portions cooperating to form a yieldable screw-receiving passage in substantial alignment with said screw-receiving opening.

3. A wing nut formed from a flat strip of sheet metal comprising a base having a screw-receiving opening and elements adjacent said opening for threaded engagement with said screw, resilient wings integral with opposed side edges of said base extending outwardly from said base, said wings having their inner broad surfaces in opposed facing relation and portions of said wings abutting at their outer edges to form finger-gripping elements, and portions of said wings intermediate said abutting portions being cupped and threaded and constituting a yieldable threaded screw-receiving passage in substantial alignment with said screw-receiving opening.

4. A wing nut formed from a flat strip of sheet metal comprising a flat base, resilient wings integral with opposed side edges of said base extending outwardly from said base, a tubular threaded shank formed from said base and disposed between said wings, portions of the outermost edges of said wings being cupped and threaded and constituting a yieldable threaded screw-receiving passage in alignment with said tubular shank, and portions of said edges abutting laterally of said cupped portions on opposite sides thereof to form finger-gripping elements.

WILLIAM A. BEDFORD, JR.